United States Patent [19]

Tsuchiya et al.

[11] Patent Number: 5,477,527
[45] Date of Patent: Dec. 19, 1995

[54] HIGH DENSITY OPTICAL DISC AND OPTICAL DISC PLAYER

[75] Inventors: Yoichi Tsuchiya, Hashima; Hitoshi Terasaki, Gifu; Shuichi Ichiura, Hashima; Toshio Ito, Hashima; Yasuyuki Kano, Hashima; Yoshimoto Yamaguchi, Gifu; Seizo Kato, Ogaki; Osamu Ota, Ibi, all of Japan

[73] Assignee: Sanyo Electric Co., Ltd., Osaka, Japan

[21] Appl. No.: 227,641

[22] Filed: Apr. 14, 1994

[30] Foreign Application Priority Data

Feb. 2, 1994 [JP] Japan .................................. 6-011087
Mar. 5, 1994 [JP] Japan .................................. 6-060019

[51] Int. Cl.$^6$ ........................................................ G11B 3/70
[52] U.S. Cl. ............................................ 369/275.4; 369/275.3
[58] Field of Search .............................. 369/275.3, 275.4, 369/275.1, 275.2, 273, 274, 276, 13

[56] References Cited

U.S. PATENT DOCUMENTS

| | | | |
|---|---|---|---|
| 5,040,165 | 8/1991 | Taii et al. | 369/275.4 |
| 5,216,646 | 6/1993 | Imanaka et al. | 369/275.3 |
| 5,353,265 | 10/1994 | Maeda et al. | 369/13 |
| 5,383,176 | 1/1995 | Inui et al. | 369/275.4 |

*Primary Examiner*—Georgia Y. Epps
*Assistant Examiner*—Tan Dinh
*Attorney, Agent, or Firm*—Armstrong, Westerman, Hattori, McLeland & Naughton

[57] ABSTRACT

A high density optical disc having a track pitch of 0.85 μm, a shortest pit length of 0.49 μm, a pit depth of 100 nm, and a pit width of 0.35 μm is rotated at a linear velocity of 2.4–2.8 m/s such that the same is optically reproduced by a laser beam having a wavelength of 635 nm which is converged to a spot size of 0.9 μm by an objective lens having a numerical aperture of 0.6. Accordingly, data is read from the optical disc at a transfer rate of 5.6 Mbps.

10 Claims, 10 Drawing Sheets

FIG.1

PRIOR ART

HIGH DENSITY OPTICAL DISC AND OPTICAL DISC PLAYER

BACKGROUND OF THE INVENTION

1. Field of the invention

The present invention relates to an optical disc and an optical disc player. More specifically, the present invention relates to an optical disc such as compact disc (CD), laser disc (LD), photo-magnetic disc and etc., and a reproducing apparatus thereof.

2. Description of the Related Art

Figure 1:
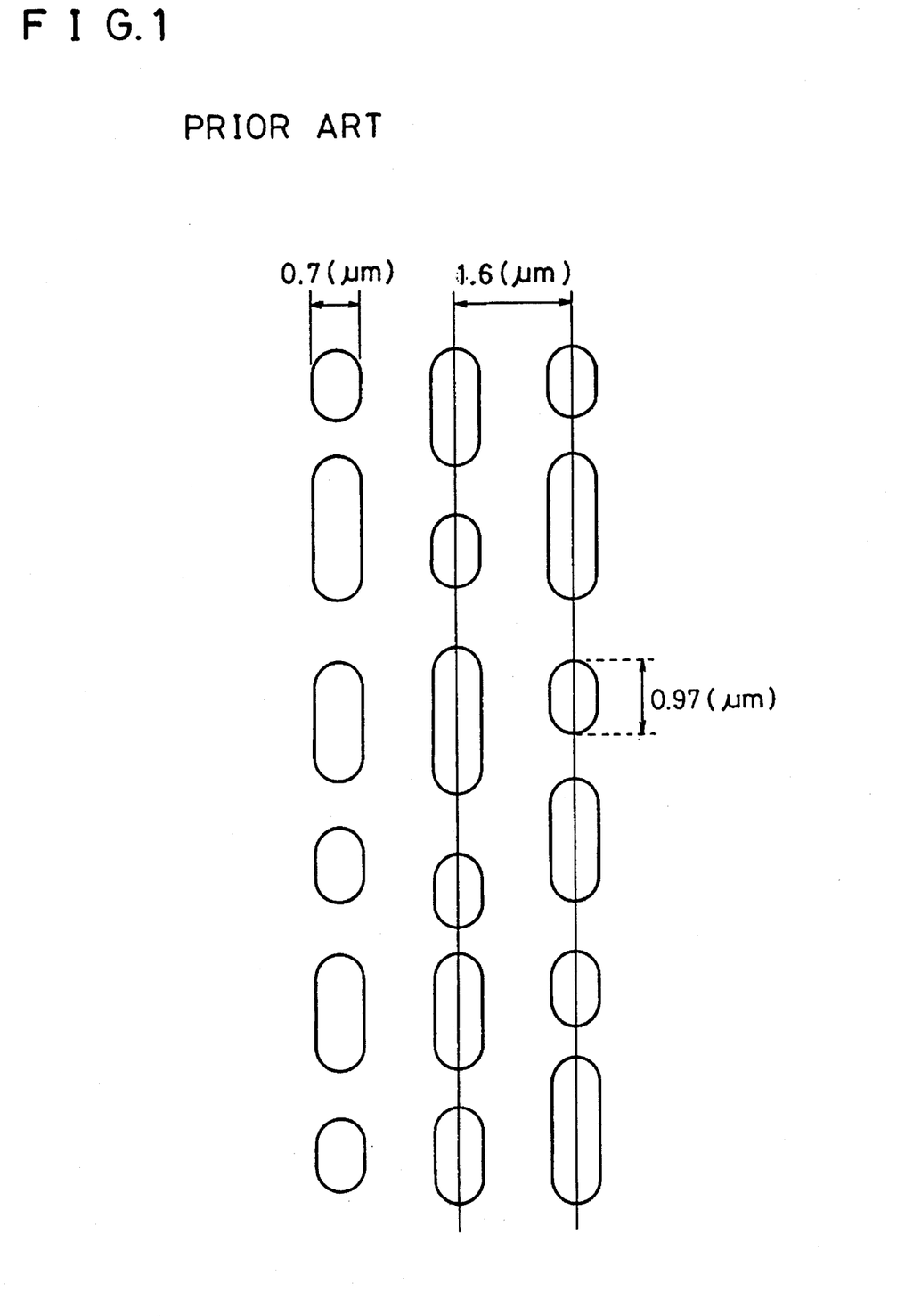
FIG. 1 is an illustrative view showing a pit size and a track pitch in a conventional standard format CD.

In a prior art 12 cm CD with a conventional standard format, as shown in FIG. 1, a shortest pit length (a pit length of 3 T) of an EFM demodulation is approximately 0.97 μm (at a time that a reproducing time is 60 minutes), a pit width is approximately 0.7 μm, and a track pitch is approximately 1.6 μm. In a player for reproducing a conventional standard format CD, the CD is rotated at a linear velocity of 1.2–1.4 m/s, and by utilizing an objective lens having a numerical aperture of 0.45, a laser having a wavelength of 780 nm and a spot size of 1.4 μm is irradiated onto a track of the CD, whereby audio data is reproduced at a transfer rate of 1.4 Mbps.

In recent years, in accordance with the development of a short wavelength laser, it becomes unnecessary to make a track pitch equal to the track pitch of the prior art. On the other hand, in order to record a video signal, it is necessary to increase a recording density on the disc. Especially, in a case of a digital video disc and etc. utilizing MPEG2 that will become a standard in the near future, it is desired that a high-density reproduction of four times the density of the conventional standard format becomes possible.

As a response to such a requirement, in an article titled as "Development of Quadruple Density Compact Disc", p.p. 174–177 of a collection of papers in JAS conference '90, a CD in which a recording density is made quadruple the recording density of the conventional standard format is proposed, in that by utilizing an argon ion laser having a wavelength of 457.9 nm, and an objective lens having a numerical aperture of 0.93, a track pitch is made 0.8 μm and a recording linear velocity is made 0.7 m/s. The quadruple density CD is reproduced with a beam spot size of 0.75 μm by utilizing an air-cooled compact argon laser having a wavelength of 488 nm and an objective lens having a numerical aperture of 0.6.

According to the prior art, it is possible to make a large recording density of a CD. However, in the prior art, since the air-cooled compact argon laser is utilized for reproducing the CD, it is impossible to make a disc player compact. In other words, the prior art can not be utilized for a miniaturized disc player.

Furthermore, in the prior art, since the argon laser having a wavelength of 488 nm is used, it is impossible to reproduce a CD on which data is recorded according to a conventional standard format. More specifically, in general, a pit is recorded with a pit depth of λ/4 n (λ= wavelength, and n=refractive index ≈1.5). Therefore, in a case of the conventional standard format, a pit is recorded with a pit depth (approximately 112 nm) applicable to a wavelength of 670 nm. On the other hand, in a case of a wavelength of 488 nm, a pit depth of approximately 81 nm is suitable. Therefore, if the CD of the conventional standard format is reproduced by the argon laser having a wavelength of 488 nm, a phase difference between an irradiated light and a reflected light at a surface of the disc does not become 180 degrees, and therefore, a level of a reproduced signal becomes small. As a result, the CD of the conventional standard format can not be reproduced by the argon laser having a wavelength of 488 nm. In other words, in the prior art, there is no compatibility for a high-density disc and a low-density (conventional standard format) disc.

SUMMARY OF THE INVENTION

Therefore, a principal object of the present invention is to provide an optical disc capable of being recorded by a novel recording format with a high-density.

Another object of the present invention is to provide a disc player capable of reproducing such a high-density optical disc.

Another object of the present invention is to provide a disc player capable of reproducing a high-density optical disc as well as a conventional standard format optical disc.

An optical disc according to the present invention has a shortest pit length of approximately 0.42–0.49 μm, a track pitch of approximately 0.70–0.85 μm, and a pit width of approximately 0.2–0.35 μm.

An optical disc player according to the present invention utilizes a laser having a spot size of approximately 0.85–0.95 μm and a wavelength of approximately 590–670 nm.

In a preferred exemplary embodiment of the present invention, the optical disc is rotated at a linear velocity of 2.4–2.8 m/s, and therefore, data is reproduced at a transfer rate of 5.6 Mbps.

The optical disc player preferably includes an objective lens having a numerical aperture of 0.6, whereby a spot size of a laser beam having a wavelength of 635 nm is made to approximately 0.89 μm. In such a disc player, a conventional standard format optical disc having a track pitch of 1.6 μm, a pit width of 0.7 μm, and a shortest pit length of 0.97 μm can also be reproduced.

In accordance with the present invention, a quadruple density optical disc in which a shortest pit length and a track pitch each half of a shortest pit length and a track pitch of the conventional standard format, respectively, is obtainable. If such an optical disc is reproduced under conditions that an optical pick-up in which a large numerical aperture of an objective lens is utilized, and that a laser beam having a spot size being a half a spot size by which the conventional standard format optical disc is reproduced and a wavelength of 635 nm, for example, is irradiated, and that a linear velocity is set to double a linear velocity at which the conventional standard format optical disc is reproduced, a signal can be reproduced at a rate quadruple that of the conventional standard format. Therefore, according to the present invention, it becomes possible to reproduce moving image data which is compressed in accordance with the MPEG2 standard.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 2:
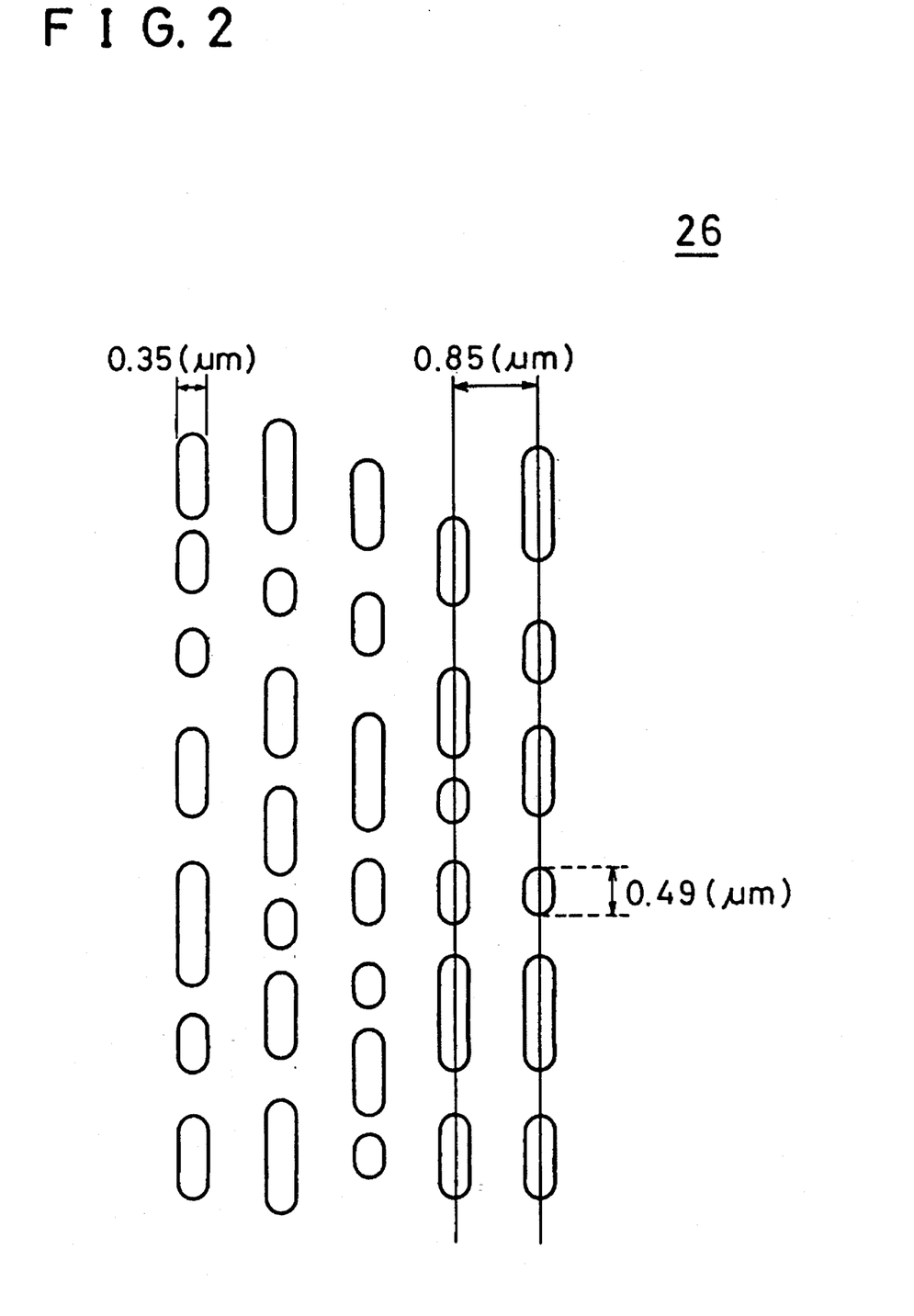
FIG. 2 is an illustrative view showing a pit size and a track pitch in a quadruple density CD according to an embodiment of the present invention.

A CD 26 of a preferred exemplary embodiment according to the present invention is shown in FIG. 2 and has a disc size (diameter) of 12 cm. The CD 26 is recorded with a shortest pit length in an EFM modulation of 0.49 μm, a pit width of 0.35 μm, and a track pitch of 0.85 μm. However, if the shortest pit length, pit width and track pitch respectively have tolerances on the order of 15%, no hindrance occurs in practical use.

In the CD 26 according to the preferred examplary embodiment shown, data is recorded by setting a recording linear velocity at 0.7 m/s, with a krypton laser having a wavelength of 407 nm and a transfer rate of 1.4 Mbps. A pit depth of 100–120 nm is desirable as similar to that of the conventional standard format CD (FIG. 1). In addition, in the CD according to the preferred exemplary embodiment, since the data is recorded with a recording density being quadruple the recording density of the conventional standard format, the CD is suitable for an optical disc in which moving image data compressed according to the MPEG2 standard is recorded. In addition, in a case where a disc size (diameter) is made half (approximately 6 cm), it is possible to secure a recording capacity similar to that of the 12 cm CD with the conventional standard format, and in such a case, there is an advantage that a disc player can be miniaturized.

Next, with reference to FIG. 3 and FIG. 4, a disc player for reproducing the preferred exemplary CD of the embodiment will be described.

Figure 3:
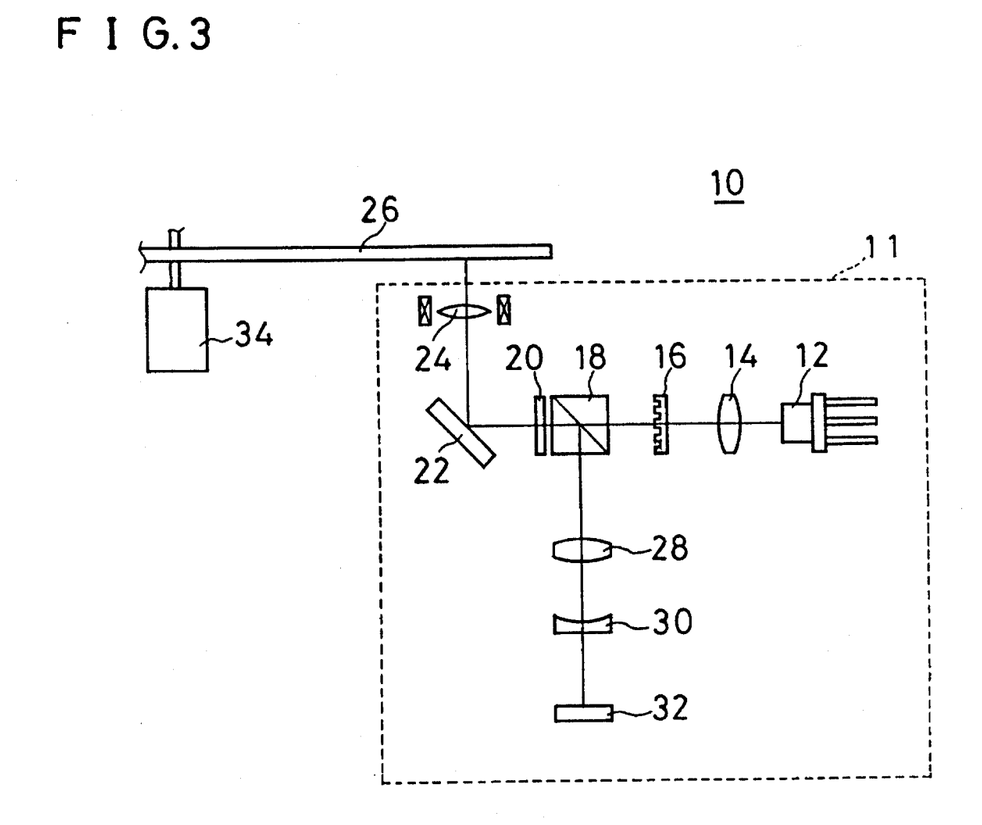
FIG. 3 is an illustrative view showing one example of an optical system of a disc player.

In the disc player 10 shown in FIG. 3, a laser beam is outputted from a semiconductor laser 12 which is included in an optical pick-up 11 and has a wavelength of 635 nm, and the laser beam is irradiated into a diffraction grating plate 16 as a coherent light through a collimator lens 14. In addition, one example of the semiconductor laser which has a wavelength of 635 nm and can be utilized as a light source of the disc player 10 is disclosed in U.S. Pat. No. 5,016,252 issued on May 16, 1991 or U.S. Pat. No. 5,146,466 issued on Sep. 8, 1992, and in this embodiment shown, the semiconductor laser according to the U.S. Pat. Nos. 5.016,252 or 5,146,466 is utilized. The laser beam is converted into three beams by the diffraction grating plate 16, and thereafter, the laser beam is irradiated into an objective lens 24 having a numerical aperture of 0.6 through a beam splitter 18, a λ/4 plate 20 and a reflection mirror 22. The laser beam outputted from the objective lens 24 is irradiated onto a recording track of the CD 26 (CD shown in FIG. 2) with a spot size (diameter) of 0.9 μm. A reflection light from the CD 26 is returned to the beam splitter 18 through the objective lens 24, the reflection mirror 22 and the λ/4 plate 20, and only the reflection light is divided by the beam splitter 18. A divided reflection light is irradiated into a photo-receiving element 32 through a condenser lens 28, and a cylindrical lens so that a reproduced signal is obtained through the photo-electric conversion at the photo-receiving element 32, and the reproduced signal is outputted from the optical pick-up 11.

In the preferred exemplary embodiment shown, a disc motor 24 for rotating the CD 26 is controlled such that a linear velocity of the CD 26 becomes 2.4–2.8 m/s. As a result, in the preferred exemplary embodiment shown, the data can be reproduced for one hour at a transfer rate of 5.6 Mbps, being quadruple the transfer rate of the conventional standard format. Therefore, the moving image data compressed according to the MPEG2 standard becomes possible to be reproduced for one hour.

Figure 4:
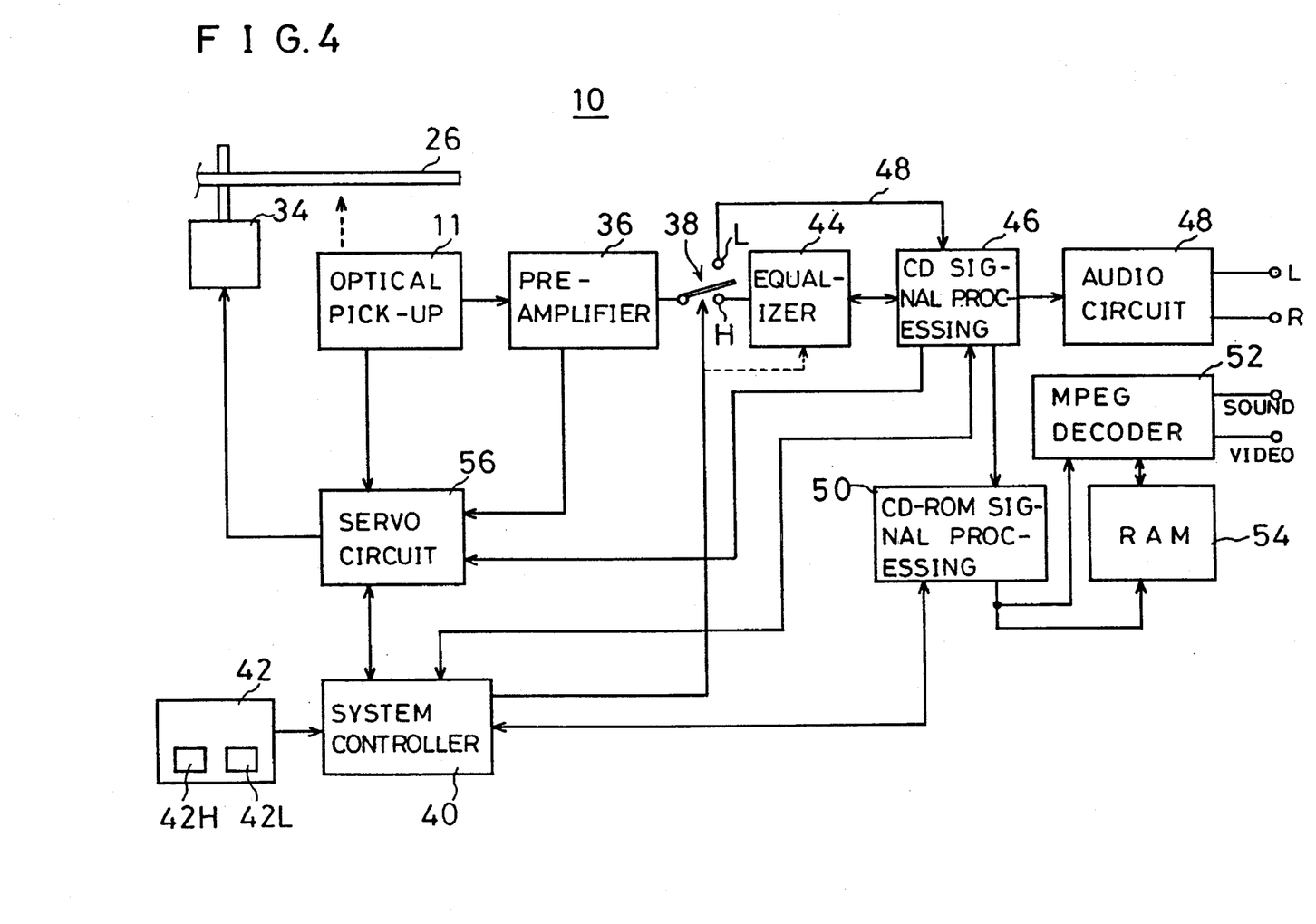
FIG. 4 is a block diagram showing a portion of circuit configuration of the disc player.

The reproduced signal outputted from the optical pick-up 11 is, as shown in FIG. 4, applied to a switch 38 through a preamplifier 36. The switch 38 is switched into a high-density side contact It or a low-density side contact L by a system controller 40 composed of a microcomputer, for example. More specifically, a signal input circuit 42 such as a remote controller is coupled to the system controller 40, and the signal input circuit 42 is provided with a high-density disc play button 42H and a low-density disc play button 42L, and the button 42H is depressed when the above described quadruple density CD 26 (FIG. 2) is to be reproduced, and the button 42L is depressed when the conventional standard format CD (FIG. 1) is to be reproduced. Therefore, to the system controller 40 from the signal input circuit 42, a signal representing whether the high-density disc or the low-density disc is to be reproduced is inputted. When the button 42H is depressed, the system controller 40 connects the switch 38 to the contact H, and the switch 38 is connected to the contact L when the button 42L is depressed. Thus, in accordance with the instruction by an operator through the button 42H or 42L, that is, the instruction from the system controller 40, the switch 38 is changed-over.

When the high-density CD 26 is reproduced, the switch 38 is connected to the contact H, and therefore, the reproduced signal from the preamplifier 36 is inputted to a CD signal processing circuit 46 through an equalizer 44. If the low-density CD is reproduced, the reproduced signal is directly inputted to the CD signal processing circuit 46 through a path 48. In addition, the switch 38 may be provided in the equalizer 44, whereby a frequency characteristic of the equalizer 44 can be changed-over in accordance with the high-density CD or the low-density CD.

The CD signal processing circuit 46 reproduces the data through an EFM demodulation of the reproduce signal.

Audio data included in the reproduced data is converted into an audio signal by an audio circuit 48. The reproduced data is also inputted to a CD-ROM signal processing circuit 50. In the CD-ROM signal processing circuit 50, only necessary data is derived from the reproduced signal having a CD-ROM format under the control by the system controller 40. The derived data is applied to a MPEG decoder 52, for example, which restores the data compressed according to the MPEG2 standard. The MPEG decoder 52 utilizes a RAM 54 as a decoder buffer, and an original signal is restored on the basis of the reproduced data. Accordingly, a video signal and an audio signal according to the data reproduced from the CD 26 are outputted from the MPEG decoder 52.

On the other hand, a tracking signal from the preamplifier 36 and a reproduced clock which is outputted from the CD signal processing circuit 46 are inputted to a servo circuit 56. The servo circuit 56 outputs a tracking servo signal on the basis of the tracking signal, and accordingly, a tracking mechanism (not shown) for the CD 26 is controlled. In addition, on the basis of the reproduced block, the servo circuit 56 outputs a rotation servo signal, and accordingly, the rotation of the disc motor 34 is controlled.

Figure 5:
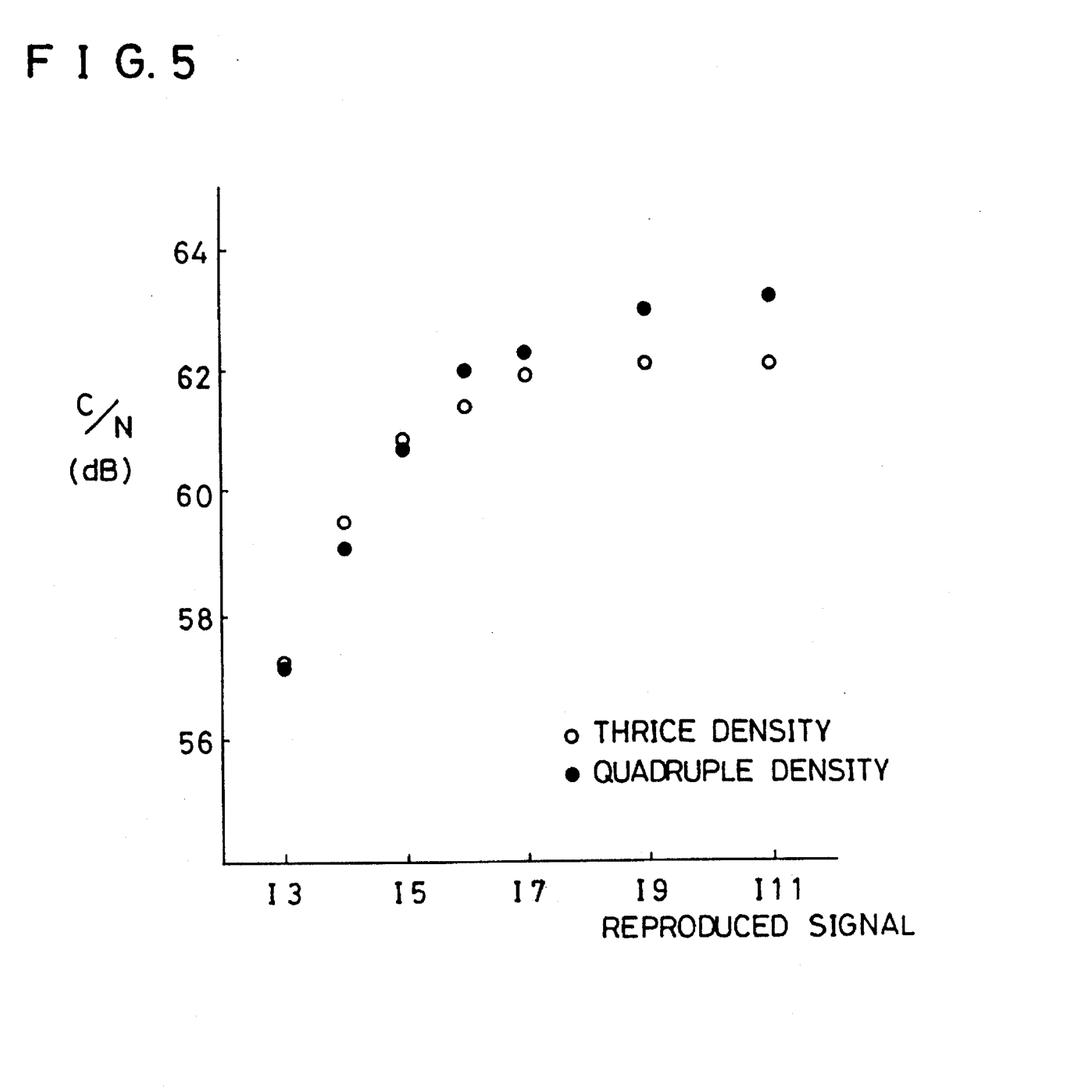
FIG. 5 is a graph showing a C/N characteristic at a time that the quadruple density CD according to the embodiment is reproduced.

In FIG. 5, a C/N ratio of a reproduced output with respect to respective pit lengths in a case where the quadruple density CD 26 according to the above described preferred exemplary embodiment is reproduced by the disc player 10 shown in FIG. 3 and FIG. 4 is shown by black circles. As seen from FIG. 5, as the C/N ratio with respect to a shortest pit frequency, 57.2 dB is secured, and the C/N ratio of a longest pit frequency with respect to the C/N ratio of the shortest pit frequency is set at a degree of 6 dB (±3 dB).

In addition, white circles in FIG. 5 indicate a C/N ratio in a case where a treble density CD having a recording linear velocity of 0.8 m/s and a track pitch of 1.0 μm is reproduced with a reproducing linear velocity of 3.2 m/s by utilizing a pick-up of a laser having a wavelength of 670 nm and an objective lens having a numerical aperture of 0.55. In such a case, as the C/N with respect to a shortest pit frequency, 57.3 dB is secured.

Thus, in the above described preferred exemplary embodiment, when the CD of 12 cm is reproduced at a double speed (linear velocity), the data can be reproduced for a reproducing time equal to a reproducing time that the conventional standard format CD is reproduced at a conventional standard linear velocity, with a frequency being four times a frequency that the conventional standard format CD is reproduced at the conventional standard linear velocity. Therefore, according to the preferred exemplary embodiment shown, the moving image data compressed according to the MPEG2 standard can be reproduced for approximately one hour.

In addition, in the above described preferred exemplary embodiment, the laser beam is converged by utilizing the objective lens having a numerical aperture of 0.6; however, as a convergence method, another means such as a principle of super-resolution that is disclosed in H. Osterberg and J. E. Wilkins; "The resolving power of a coated objective," J. Opt. Soc. Am., 39 (1949) 553–557. or J. E. Wilkins: "The resolving power of a coated objective II," J. Opt. Soc. Am., 40 (1950) 222–224. may be utilized. Furthermore, the wavelength of the laser beam is desirably 635 nm; however, it is, of course, possible to obtain a small beam spot by utilizing another short wavelength laser and a suitable convergence means. Furthermore, the wavelength of 635 nm is a wavelength by which the data of the conventional standard format can be also reproduced with no hindrance, as described later.

The inventors having investigated various degrees of falling of an amplitude of the reproduced signal by variously changing the pit length and the reproducing linear velocity, and on the basis of results thereof, the inventors have determined that a shortest pit length of the EFM modulation can be shortened by some degree, or that the reproducing linear velocity can be slowed by some degree.

Furthermore, the inventors have investigated degrees of falling of an amplitude of a 3-beam tracking signal by variously changing a track pitch, and on the basis of results thereof, the inventors evaluate that the track pitch can be made narrower by some degree without hindering for the tracking servo.

Furthermore, the inventors have evaluated a range of a spot size by which the quadruple density CD according to the above described preferred exemplary embodiment can be faithfully reproduced by changing the spot size of the laser beam irradiated onto the CD.

Furthermore, the inventors have evaluated a range of a wavelength at which not only the CD according to the above described preferred exemplary embodiment but also the CD of the conventional standard format can be faithfully reproduced good by changing the wavelength of the laser beam.

Figure 6:
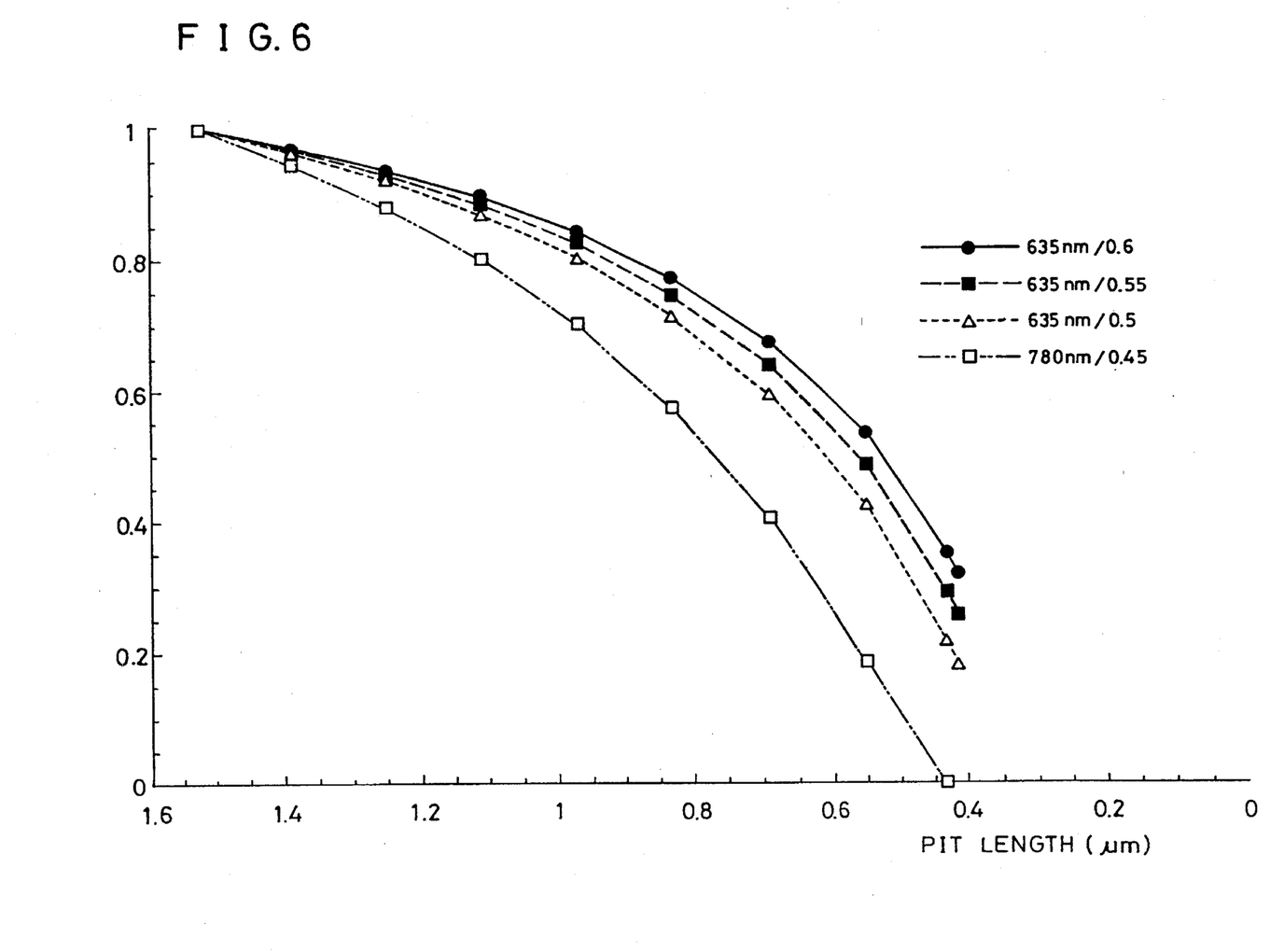
FIG. 6 is a graph showing a relationship between an amplitude of a reproduced signal and a pit length with parameters of a wavelength of a laser beam and a numerical aperture of an objective lens in the embodiment.

In FIG. 6, an ordinate indicates an amplitude ratio with respect to an amplitude of 11 T of the EFM modulation, and an abscissa indicates a pit length. At this time, a wavelength of the laser beam is made be approximately 635 nm, and the numerical apertures of the objective lens are made be 0.6, 0.55 and 0.5, and the reproducing linear velocity is made be 0.6 m/s. In addition, only for reference, an amplitude ratio of a case where the wavelength of the laser beam is 780 nm and the numerical aperture of the objective lens is 0.45 is also shown.

As seen from FIG. 6, an amplitude of the reproduced signal of 3 T (a pit length is approximately 0.42 μm) is lowered to approximately 40% of an amplitude of 11 T. 40% is a limit that a fallen amplitude can be compensated for by the equalizer 44 shown in FIG. 4. In addition, in a case where the degree of the fall of the amplitude of the reproduced signal exceeds the above described 40%, even if the signal is emphasized by the above described equalizer 44 (FIG. 4), a noise component is also emphasized, and therefore, the C/N is poor. Therefore, a value shown in FIG. 6, that is, 3 T=0.42 μm becomes a limit to which a shortest pit length in the EFM modulation can be shortened while still maintaining the quality of the reproduced signal. On the other hand, an upper limit of the shortest pit length is dependent on a recording density. In a case of the quadruple density CD, the upper limit is 0.5 μm. Therefore, it will be understood that the shortest pit length of the optical disc according to the present invention is to be within a range of 0.42 μm–0.5 μm.

Figure 7:
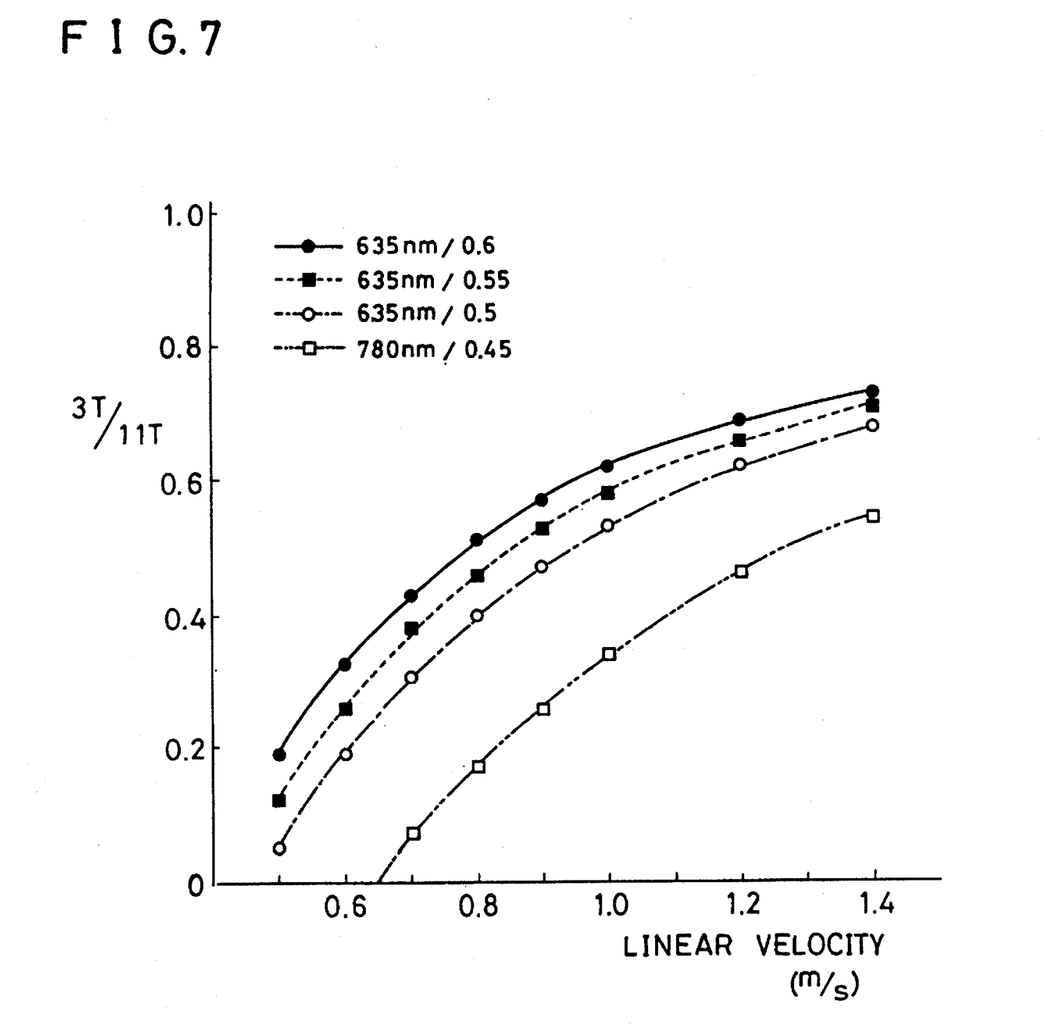
FIG. 7 is a graph showing a relationship between a linear velocity and an amplitude ratio of the reproduced signals of a pit length of 3 T and a pit length of 11 T with parameters of a wavelength of a laser beam and a numerical aperture of an objective lens in the embodiment.

Furthermore, in FIG. 7, an amplitude ratio of 3 T/11 T in the EFM modulation with variably changing the reproducing linear velocity is shown. As shown in FIG. 7, at the linear velocity of 0.6 m/s, the ratio of 3 T with respect to lit is approximately 40%.

Figure 8:
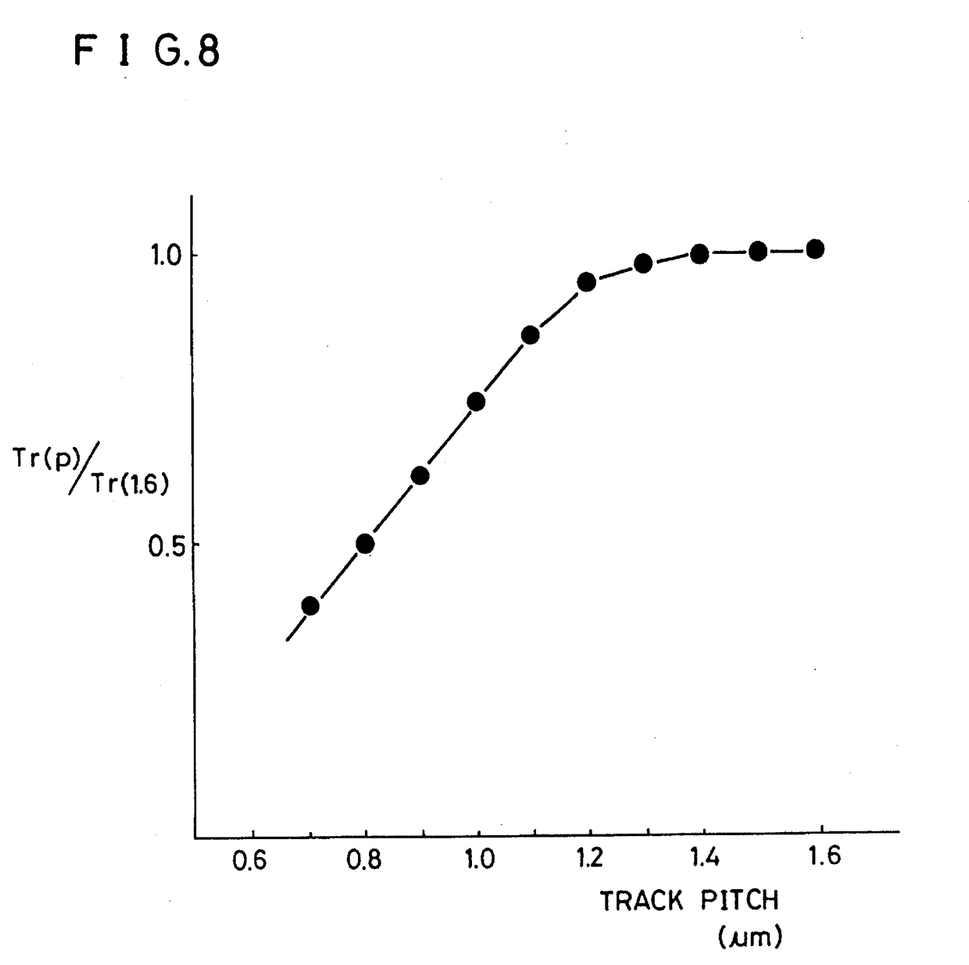
FIG. 8 is a graph showing a relationship between a track pitch, and an amplitude of a tracking signal in the embodiment and an amplitude of a tracking signal of a case of a track pitch of 1.6 μm.

In FIG. 8, a graph indicating the degree of a fall of an amplitude of the tracking signal with a variably changing track pitch is shown. The pit width is 0.20–0.35 μm, and a beam spot size in a direction traversing the track is approximately 0.90 μm. Furthermore, the wavelength of the laser is approximately 635 nm, and the numerical aperture of the objective lens is 0.6.

As seen from FIG. 8, at a track pitch of 0.7 μm, a ratio of the tracking signal with respect to the tracking signal of the track pitch of 1.6 μm is approximately 40%. 40% is a limit at which the tracking servo can be performed stably by the servo circuit 56 shown in FIG. 6. That is, the track pitch of 0.7 μm is a limit at which the tracking servo can stably perform. On the other hand, an upper limit of the track pitch is dependent on a recording density, and the upper limit of a case of the quadruple density CD is 0.85 μm. Therefore, it will be understood that the track pitch of the optical disc according to the present invention is to be within a range of 0.7–0.85 μm.

However, in a present disc producing process, an error at a degree of ±0.1 μm occurs due to a pitch variation in cutting an original disc and a distortion in pressing a copy disc, and therefore, if the limit of the track pitch is to be made 0.7 μm, it is preferable that the track pitch is made at a degree of 0.8 μm. In addition, in a case where the error can be made smaller according to the improvement of the disc producing process, it is, of course, possible to be made close to 0.7 μm.

Figure 9:
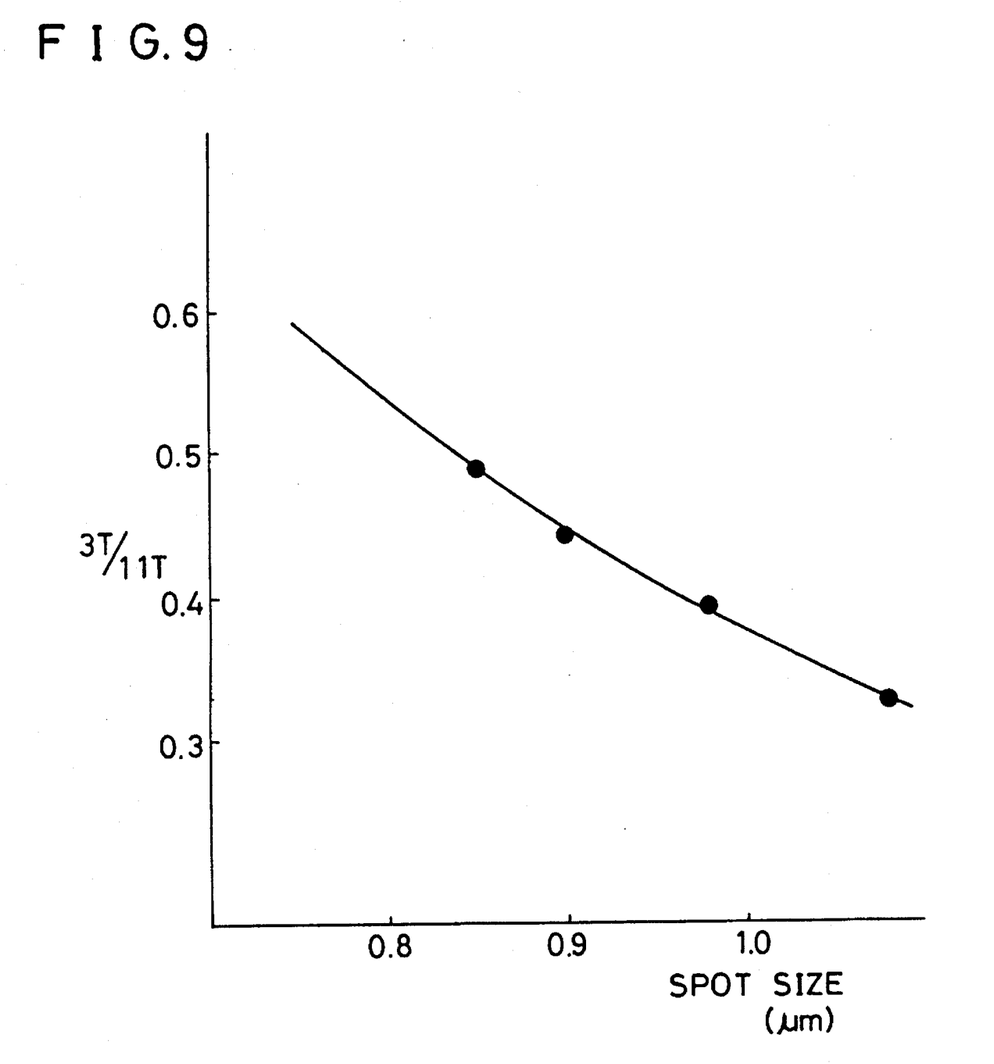
FIG. 9 is a graph showing an amplitude ratio of the reproduced signals of the 3 T pit length and the 11 T pit length with respect to a spot size.

FIG. 9 is a graph showing an amplitude ratio (3 T/11 T) of the reproduced signal with respect to a spot size of the laser beam irradiated onto the CD. As shown in FIG. 9, the amplitude ratio is changed as the spot size is changed, and the amplitude ratio becomes greater than 40% with a spot size less than 0.95 μm. Furthermore, in a case where the laser beam having a wavelength of 635 nm is converged by the objective lens having a numerical aperture of 0.6, it is difficult to obtain a spot size less than 0.85 μm. Therefore, it will be understood that a spot size of the disc player according to the present invention is to be within a range of 0.90±0.05 μm, that is, 0.85–0.95 μm.

Figure 10:
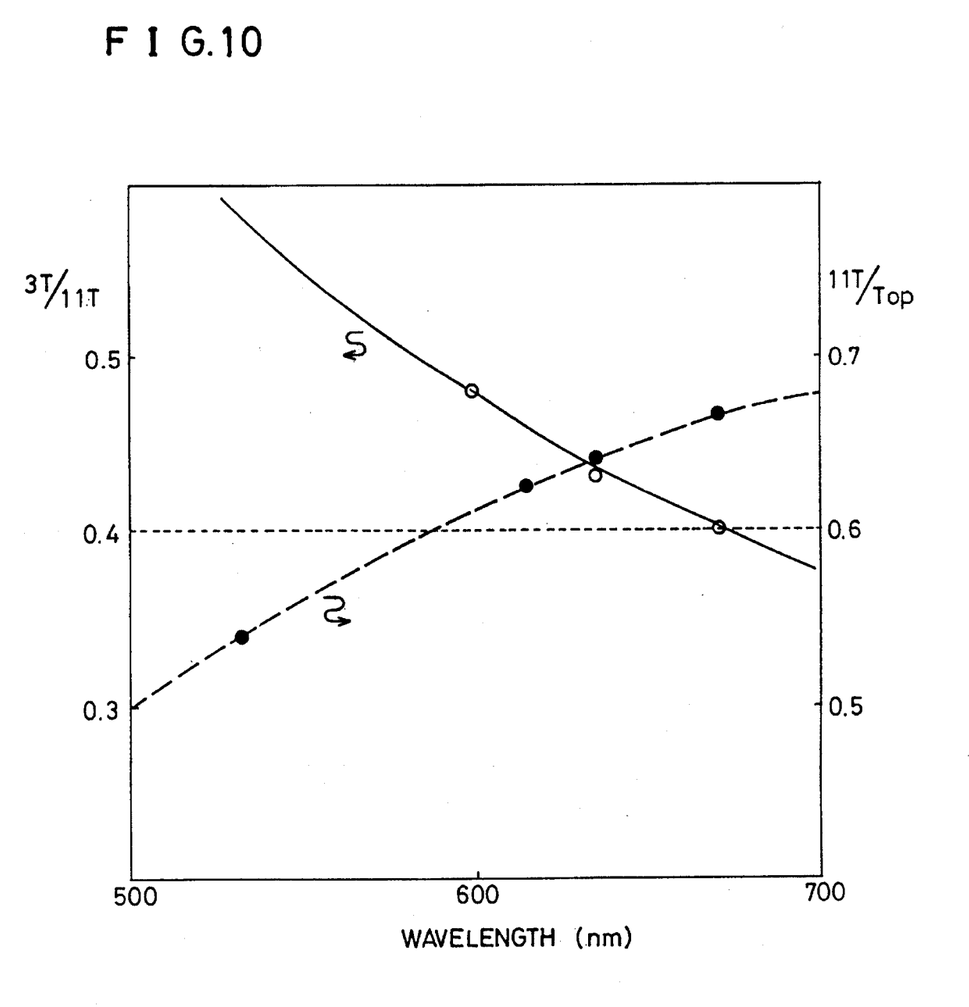
FIG. 10 is a graph showing a relationship between a wavelength and an amplitude ratio of the reproduced signals of the quadruple density CD according to the embodiment, and an amplitude ratio of reproduced signals of the conventional standard format CD.

In FIG. 10, a change of the amplitude ratio (3 T/11 T) with respect to the wavelength of the laser beam in the embodiment of the quadruple density CD is shown by white circles. Furthermore, only for reference, an amplitude ratio (11 T/Top) with respect to the wavelength of the laser beam in the conventional standard format CD is also shown by black circles. In addition, "Top" means a difference between an amplitude of a case no reflection light from the CD is returned to the optical pick-up and a maximum light amount at a time that 11 T is reproduced.

The longer wavelength, the larger spot size, and therefore, the signal of 3 T becomes small in the quadruple density CD. In order to secure the amplitude ratio of 3 T/11 T of more than 40%, as seen from FIG. 10, it is required that the wavelength is less than 670 nm. On the other hand, if the wavelength is made too short, the difference between the wavelength and the optimum wavelength for the conventional standard format CD becomes larger. In order to secure 11 T/Top of 0.6 (the present standard) or more in the conventional standard format, as seen from FIG. 10, it is required that the wavelength is more than 590 μm. Therefore, the wavelength of the laser beam used in the disc player according to the present invention is to be within a range of 590–670 nm.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc having a track pitch of 0.7–0.85 μm, a pit width of 0.20–0.35 μm, and a shortest pit length of 0.42–0.49 μm.

2. An optical disc according to claim 1, wherein said track pitch is 0.85 μm.

3. An optical disc according to claim 1, wherein said shortest pit length is 0.49 μm.

4. An optical disc according to claim 1, wherein said track pitch is 0.85 μm, and said shortest pit length is 0.49 μm.

5. An optical disc player for reproducing information signals from an optical disc having a track pitch of 0.7–0.85 μm, a pit width of 0.20–0.35 μm, and a shortest pit length of 0.42–0.49 μm, comprising:

a semiconductor laser having a wavelength of 590–670 nm;

irradiating means for irradiating a beam from said semiconductor laser onto said optical disc with a spot size of 0.85–0.95 μm; and a photo-receiving means for receiving a reflected beam from said optical disc and outputting a reproduced signal.

6. A disc player according to claim 5, wherein said irradiating means includes means for irradiating said beam with a spot size of 0.90 μm.

7. A disc player according to claim 5, said irradiating means includes a beam condensing means for condensing said beam.

8. A disc player according to claim 6, wherein said beam condensing means includes an objective lens having a numerical aperture of approximately 0.6.

9. A disc player according to claim 5, wherein said irradiating means includes beam condensing means.

10. A disc player according to claim 5, further comprising motor means for rotating said optical disc at a linear velocity of 2.4–2.8 m/s.

* * * * *